May 16, 1961
A. L. MILLER ET AL
2,984,649
MODIFICATION OF BUTYL RUBBER BY TREATMENT
WITH ORGANIC ACID ANHYDRIDE
Filed June 26, 1956
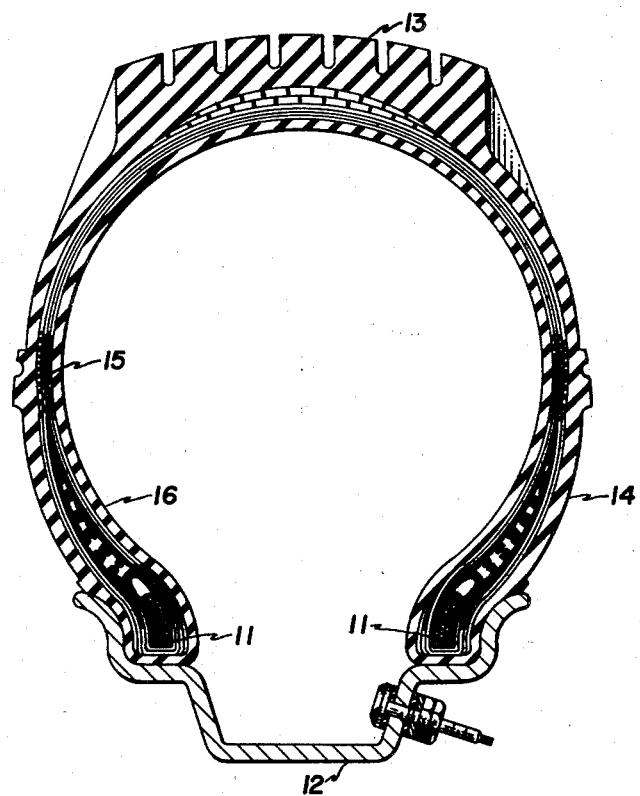
Alfred L. Miller
George E. Serniuk   Inventors
By *W. H. Smyers* Attorney

United States Patent Office 2,984,649
Patented May 16, 1961

2,984,649

MODIFICATION OF BUTYL RUBBER BY TREATMENT WITH ORGANIC ACID ANHYDRIDE

Alfred L. Miller, Cranford, and George E. Serniuk, Roselle, N.J., assignors to Esso Research and Engineering Company, a corporation of Delaware Filed June 26, 1956, Ser. No. 593,898

8 Claims. (Cl. 260—78.4)

The present invention relates to rubbery polymeric compositions which are copolymers of isoolefins and multiolefins, and to improvements in the technique of processing butyl rubber prior to the vulvanization thereof. More particularly, it relates to novel rubbery compositions formed by treating butyl rubber with certain anhydrides and improved vulcanizates formed therefrom.

The rubbery copolymers of the present invention generally contain a major portion of isoolefins and a minor portion of multiolefins. These copolymers are commonly referred to in the literature as "butyl rubber" or GR–I rubber (Government Rubber—Isobutylene). For example, it is referred to as "butyl rubber" in "Synthetic Rubber" by G. S. Whitby, pages 608–609 (1954 edition). The expression "butyl rubber" as employed in the specification and claims is intended to include copolymers having about 90 to 99.5% by weight of an isoolefin which has about 4 to 7 carbon atoms, and about 10 to 0.5% by weight of a conjugated multiolefin having about 4 to 14 carbon atoms.

It has now been discovered that certain acid anhydrides react with unvulcanized butyl rubber in the presence of a Friedel-Crafts catalyst to produce a modified butyl rubber. It is believed that the reaction product is a butyl rubber containing a ketone or a substituted ketone function with approximately the same degree of unsaturation as untreated butyl rubber.

The invention will be best understood from the following description wherein reference is made to the drawing in which the single figure is a vertical section of a pneumatic tubeless tire containing butyl rubber modified in accordance with the present invention.

Acid anhydrides suitable for the purposes of the present invention have the general formula:

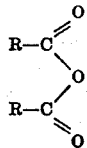

wherein R may be alkyl, aryl, alkaryl, aralkyl and halogenated or other derivatives and mixtures thereof. The radicals may contain from 1 to 25 carbon atoms, preferably 1 to 12 carbon atoms or a total of 4 to 52 carbon atoms and 4 to 26 carbon atoms per molecule, respectively. Acid anhydrides that may be used in the practice of this invention are anhydrides of acetic acid, chloroacetic acid, bromoacetic acid, fluoroacetic acid, benzoic acid, succinic acid, phthalic acid, p-toluic acid, phenylacetic acid, m-nitro phenyl propionic acid, 2-phenyl butyric acid, p-bromobenzoic acid, dodecanoic acid, phenoxyacetic, p-nitro pheny acetic, naphthoic, 2,4-dinitrobenzoic, anisic, diphenic, tetrachlorophthalic, furoic, and naphthenic acids.

In preparing butyl rubber polymer, the isoolefin and multiolefin are mixed in the ratio of a major proportion of the isoolefin and minor proportion of the multi- olefin, the preferred range being about 70 to 99.5, preferably 85 to 99.5 parts by weight of the isoolefin to about 30 to 0.5, preferably 0.5 to 15 parts by weight of the multiolefin. High purity is desirable in both materials, it being preferable to use an isoolefin of at least 98% purity, although satisfactory copolymers may be made from multiolefins of a lower purity.

In general, the rubber comprises the reaction product of a $C_4$ to $C_7$ isoolefin, such as isobutylene or 2-methyl-1-butene, with a $C_4$ to $C_{10}$ conjugated diolefin, such as isoprene, butadiene, dimethyl butadiene or piperylene. The reaction product of isobutylene and isoprene is preferred. For instance, 97 to 97.5% by weight of isobutylene is reacted with 2.5 to 3.4% by weight of isoprene.

The mixture of monomers is cooled to a temperature within the range between about 0° and —200° C., preferably between about —40° and —160° C. It is especially preferred that the reaction temperature be between —60° C. and —130° C. The materials may be cooled by the use of a refrigerating jacket, which surrounds the mixing tank. Alternatively, the mixture may be cooled by means of an internal refrigerant. In this case, it is mixed directly with the starting materials. Refrigerants which have been found to be satisfactory for internal use are liquid propane, solid carbon dioxide, liquid ethane, liquid ethylene, etc.

The cold mixture is polymerized by the addition of a Friedel-Crafts catalyst, preferably an aluminum halide catalyst in a liquid or dissolved form. The amount of catalyst employed is generally about 0.15% to about 1.0% by weight of the mixed olefins. The liquid catalyst may be sprayed on to the surface of the rapidly stirred mixture, or it may be introduced in the form of a pressured stream.

The polymerization reaction proceeds rapidly. The polymer precipitates out of solution in the form of a flocculent white solid. When the polymerization has reached the desired stage, the material is conveniently recovered by charging the whole mixture into warm water which may contain alcohol, ether, aldehyde or organic acid to inactivate the catalyst. The polymer is then recovered from the water suspension in any convenient manner, such as straining or filtering. It is then dried either by passing it through a tunnel drier, or on a mill. The product has plastic and elastic properties.

The polymer has a Staudinger molecular weight between approximately 20,000 to 150,000. It is desired that the molecular weight fall between about 35,000 and 100,000 and it is preferred that it be in the range between 45,000 and 60,000. The material has a Wijs iodine number between about 1 and 50, although it is preferred that the iodine value be between about 5 and 15. The preparation of the above rubbery butyl copolymer is described in U.S. Patent No. 2,356,128 to which reference may be had for further details.

The butyl rubber is then dissolved in any suitable substantially inert liquid organic solvent, such as a substantially inert hydrocarbon or halogenated derivatives of substantially inert hydrocarbons. Examples of suitable solvents are hexane, heptane, pentane, naphtha, branched paraffins, straight run mineral spirits, cyclohexane, cyclopentane, alkyl substituted cycloparaffins, benzene, toluene, chlorobenzene, chloroform, trichloroethane, carbon tetrachloride, etc.

The concentration of butyl rubber in the solvent partially depends on the molecular weight of the butyl rubber. In general, the concentration of a butyl rubber having a viscosity average molecular weight of about 200,000 to about 400,000 will be between about 1 and 30% by weight of the solvent, preferably about 5 to 20%.

In the practice of the present invention, prior to curing, 5 to 20% by weight of the copolymer is dissolved in a solvent, for example chloroform, and about 0.9 to 12% by weight of an anhydride is added to the solution. Generally about 1 to 11 parts by weight of anhydride are reacted with 100 parts by weight of polymer. Preferably about 1 to 5 parts by weight of anhydride are reacted with 100 parts by weight of polymer. A Friedel-Crafts catalyst, generally dissolved in the same solvent, is sprayed on the surface of the rapidly stirred mixture. Suitable catalysts include aluminum chloride, aluminum bromide, zirconium chloride, stannic chloride, titanium chloride, boron trifluoride, boron trifluoride etherate, zinc chloride, perchloric acid or sulfuric acid. Hydrogen fluoride is advantageously used when the acylating agent is either an acid, acid halide, ester or acid anhydride.

The amount of catalyst employed is generally between 1 and 15% by weight of the reactants, and preferably about 5% by weight. The reaction mixture is stirred for about 1 to 24 hours at a temperature between 25 and 100° C. It is preferred that the temperature be between 25 and 80° C. The modified copolymer is then separated from the catalyst by a suitable means, for example, the mixture may be poured into water and the catalyst residues decanted off. The polymer is washed with water and then treated with a vase, such as ammonium hydroxide. Water washing is continued until the wash water is approximately neutral. The resulting butyl rubber polymer may be recovered in various ways. It may be precipitated with acetone or any other known non-solvent for the rubber and dried under about 1 to 760 mm. of mercury absolute pressure at about 0 to 180° C., preferably about 50 to 150° C. Other methods of recovering the polymer from solution involve spray or drum drying techniques. Alternatively, the rubber-containing solution may be injected into a vessel containing agitated water heated to a temperature sufficient to flash off the solvent and form an aqueous slurry of the butyl rubber. The rubber may then be separated from the slurry by filtration, dried and recovered as a "crumb," or as a dense sheet or slab by conventional milling and/or extruding procedures.

The resulting modified butyl rubber polymer is similar to ordinary butyl rubber as to rubbery characteristics. It also has the property of being curable with zinc oxide and sulfur with or without added vulcanization accelerators such as thiuram polysulfides or other derivatives of thiocarbamic acid.

The copolymer, when cured has a good elastic limit, tensile strength, abrasion resistance and flexure resistance. For vulcanization purposes, the copolymer may be compounded with various fillers such as silicate or titanium dioxide, as well as with plasticizers, which are preferably hydrocarbon plasticizer oils, before the curing step.

In order to more fully illustrate the present invention, the following experimental data are given:

*Example I*

1589 grams of a chloroform solution containing 10 grams of butyl polymer/100 ml. of chloroform was added to a reaction vessel fitted with a mechanical stirrer and condenser. To this solution was added 10.7 grams of acetic anhydride and 5.25 grams of boron trifluoride etherate, dissolved in 50 ml. of chloroform. The mixture was stirred for three hours at room temperature (25° C.) and then allowed to stand overnight, at the same temperature. The following day, the reaction mixture was stirred for 4 hours at room temperature and then poured into water to remove the catalyst. The modified polymer was washed with water to remove the catalyst and then treated with 50 ml. of concentrated ammonium hydroxide. The water washing was continued until the wash water was neutral. The product was coagulated with acetone and the residual solvents were stripped from the product by heating it under vacuum (24" of water) for 16 hours at 60° C.

The product and a control sample of unmodified butyl polymer were compounded and cured as follows:

|  | Control Polymer | Modified Polymer |
|---|---|---|
| Modified polymer |  | 100 |
| Control polymer | 100 |  |
| Carbon black | 50 | 50 |
| Stearic acid | 1 | 1 |
| Zinc oxide | 5 | 5 |
| Sulfur | 2 | 2 |
| Tellurium diethyl dithiocarbamate | 1 | 1 |

The polymer, carbon black and stearic acid were mixed and heated for 10 minutes at 300° F. The zinc oxide, sulfur and tellurium diethyl dithiocarbamate were then added and the mixture was cured for 45 minutes at 307° F. The following physical evaluations were obtained for the modified and control products:

|  | Control Polymer | Modified Polymer |
|---|---|---|
| Resistivity, $\Omega$ cm.$^3$ | $1.80 \times 10^8$ | $1.593 \times 10^8$ |
| Modulus at 300% elong. | 1,175 | 1,950 |
| Tensile, p.s.i.g. | 2,750 | 2,850 |
| Elongation, percent | 520 | 420 |

*Example II*

100 grams of butyl polymer was dissolved in chloroform (10 grams of butyl/100 ml. of chloroform) and placed in a reactor equipped with a mechanical stirrer. The atmosphere in the reactor was filled with dry nitrogen and 17.9 grams of chloroacetic anhydride was added to the butyl polymer. 5.26 grams of boron trifluoride etherate, dissolved in chloroform, was added and the mixture was stirred at room temperature for 6 hours. After standing overnight the product was separated and purified by a multiple solution-precipitation technique using benzene as the solvent and acetone as the anti-solvent.

The product, after being stripped of residual solvent by heating 16 hours at 60° C. under a 24" vacuum, was compounded as follows:

|  | Control Polymer | Modified Polymer |
|---|---|---|
| Modified polymer |  | 100 |
| Control polymer | 100 |  |
| Carbon black | 50 | 50 |
| Stearic acid | 0.5 | 0.5 |
| Zinc oxide | 5 | 5 |
| Surfur | 2 | 2 |
| Tellurium diethyl dithiocarbamate | 1 | 1 |

The control and modified polymers were mixed with carbon black and stearic acid and hot milled for 10 minutes at 300° F. and then cooled. Zinc oxide, sulfur and dithiocarbamate were added and the compounds were cured for 60 minutes at 307° F. The following physical evaluations were obtained for both the modified and control polymers:

|  | Control Polymer | Modified Polymer |
|---|---|---|
| Resistivity, $\Omega$ cm.$^3$ | $3.01 \times 10^8$ | $5.5 \times 10^8$ |
| Modulus at 300% elong. | 1,150 | 1,375 |
| Tensile, p.s.i. | 2,900 | 3,050 |
| Elongation, percent | 550 | 515 |

*Example III*

100 grams of butyl polymer was reacted with 6.35 grams of chloroacetic anhydride (1 mol anhydride/mol of polymer double bonds) in chloroform for 6 hours at room temperature in the presence of 5.27 grams of boron trifluoride etherate. The catalyst was quenched with 100 ml. of water and the product isolated by the method described in Example II above.

The product and control polymer were compounded according to the recipe used in Example II with the exception that the hot milling step was omitted.

|  | Control Polymer | Modified Polymer |
|---|---|---|
| Resistivity, Ω cm.¹ | 5.1018×10⁷ | 2.4306×10⁸ |
| Modulus at 300% elong. | 1,450 | 1,850 |
| Tensile, p.s.i. | 2,700 | 2,650 |
| Elongation, percent | 480 | 410 |

The results show an increase in modulus at 300% elongation was obtained with the modified butyl rubber. This is indicative of a faster cure and improved vulcanization as well as more cross linking between the chains. It is also significant that the treatment did not lower the tensile strength, and in most instances it increased the tensile strength. The resistivity figures show that there was good distribution of carbon black.

Referring now to the drawing, the single figure depicts a pneumatic tubeless tire, mounted on a tire wheel rim 12, said tire comprising a hollow toroidal type member which is U-shaped in cross section by virtue of an open portion which extends around the inner periphery of the member. In other words, the tire is a tubular type structure which has a cross section in the form of an open-bellied body with spaced terminal portions to define a member generally resembling a horseshoe. The terminal portions constitute the bead portions 11 of the tire inside of which are a plurality of bead wires adhesively imbedded and molded in rubber. The outer surface of the bead portion is advantageously formed into an air sealing means, such as a plurality of ribs to aid in adhesion to rim 12 when the tire is inflated.

The outer surface of the tire also includes tread area 13 and sidewalls 14. The open portion of the horseshoe-shaped tire faces that portion of the inner circumference of the tire which is adjacent to the area 13 of the tire. The remaining construction of the tire may vary according to conventional fabrication, but in general the tire is a multi-layered type of structure with an outer layer as above mentioned. The layer next adjacent the outer layer generally comprises a carcass 15 which includes a rubber that has incorporated therein a fabric composed of a plurality of cotton, rayon or nylon cords. The tire also includes an inner lining 16 advantageously made from 50 to 99 parts by weight of butyl rubber or covulcanizates of butyl rubber and GR-S rubber. The inner lining must be substantially impermeable to air. The lining preferably comprises 100 parts by weight of butyl rubber of the modified type disclosed in this application.

For example, the rubber inner liner may comprise the reaction product of about 70 to 99.5 wt. percent of a $C_4$ to $C_7$ isoolefin, such as isobutylene, and about 0.5 to 30% of a $C_4$ to $C_{10}$ multiolefin, such as isoprene which has been modified prior to vulcanization with an anhydride such as acetic acid anhydride.

The modified butyl rubber-containing vulcanized compositions of the present invention may be employed generally throughout the tire. For instance, in addition to the inner lining, the other layers of the tire such as the intermediate carcass layer and/or the outer layer (including the tread area, the sidewall and the outer bead portion) may contain modified butyl rubber of the type herein disclosed.

Resort may be had to various modifications and variations without departing from the spirit of the present invention or the scope of the appended claims.

What is claimed is:

1. A process for modifying a rubbery copolymer having a Staudinger molecular weight of about 20,000 to 150,000 and containing 85 to 99.5% by weight of an isoolefin which has 4 to 7 carbon atoms and 0.5 to 15% by weight of a multiolefin having 4 to 10 carbon atoms comprising reacting at a temperature of about 25° to 100° C. for at least 1 hour a major proportion of said copolymer with a minor proportion of an organic anhydride having between 4 and 26 carbon atoms in the presence of a small amount of Friedel-Crafts catalyst and recovering a modified copolymer.

2. In a process for vulcanizing rubber, the improvement which comprises the step of curing a modified rubbery copolymer made according to claim 1 in the presence of a vulcanizable quantity of sulfur.

3. A process for modifying a rubbery copolymer having a Staudinger molecular weight of about 20,000 to 150,000 and containing 85 to 99.5% by weight of isobutylene and 0.5 to 15% by weight of a conjugated diolefin having 4 to 6 carbon atoms comprising reacting at a temperature of about 25° to 100° C. for at least 1 hour 100 parts by weight of said copolymer with about 1 to 11 parts by weight of an organic anhydride having between 4 and 26 carbon atoms in the presence of about 1 to 15 wt. percent, based on the weight of the reactants, of a Friedel-Crafts catalyst and recovering a modified copolymer.

4. A process according to claim 3 in which the anhydride contains a halogen.

5. A process according to claim 3 in which the anhydride is acetic anhydride.

6. A process according to claim 3 in which the anhydride is chloroacetic anhydride.

7. A process for modifying a rubbery copolymer of isobutylene and isoprene, said copolymer having a Staudinger molecular weight of about 20,000 to 150,000 and an iodine number of about 1 to 50, comprising reacting 100 parts by weight of the copolymer dissolved in an inert organic solvent with about 1 to about 11 parts by weight of an organic acid anhydride having between 4 and 26 carbon atoms in the presence of about 1 to 15% by weight, based on the weight of the reactants, of a Friedel-Crafts catalyst at from about room temperature up to 100° C. and recovering a modified copolymer.

8. A process for modifying a rubbery copolymer containing 85 to 99.5% by weight isobutylene and 0.5 to 15% by weight of a conjugated diolefin having 4 to 6 carbon atoms, said copolymer having a Staudinger molecular weight of about 20,000 to 150,000 and an iodine number of about 1 to 50, comprising dissolving 100 parts by weight of said copolymer in an inert organic solution, mixing the copolymer solution with about 1 to 11 parts by weight of an organic acid anhydride having between 4 and 26 carbon atoms, reacting said copolymer with said anhydride in the presence of about 1 to 15% by weight, based on the weight of the reactants, of Friedel-Crafts catalyst dissolved in an inert organic solvent at from about room temperature up to 80° C. and recovering a modified rubbery copolymer.

References Cited in the file of this patent

UNITED STATES PATENTS

| 2,142,980 | Huijser et al. | Jan. 3, 1939 |
| 2,344,213 | Otto | Mar. 14, 1944 |
| 2,427,514 | Sterrett et al. | Sept. 16, 1947 |
| 2,845,403 | Gunberg | July 29, 1958 |

OTHER REFERENCES

Lightbrown: Rubber Age, vol. 51, #5, 1942.